(12) United States Patent
Kang et al.

(10) Patent No.: US 9,322,979 B2
(45) Date of Patent: *Apr. 26, 2016

(54) BACKLIGHT UNIT AND LIQUID CRYSTAL DISPLAY INCLUDING SAME

(71) Applicant: SAMSUNG ELECTRONICS CO., LTD., Suwon-si, Gyeonggi-do (KR)

(72) Inventors: Hyun A Kang, Suwon-si (KR); Eun Joo Jang, Suwon-si (KR); Shin Ae Jun, Seongnam-si (KR); Hyo Sook Jang, Hwaseong-si (KR); Chul Ho Jung, Gwangju (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 561 days.

This patent is subject to a terminal disclaimer.

(21) Appl. No.: 13/728,977

(22) Filed: Dec. 27, 2012

(65) Prior Publication Data

US 2013/0169904 A1  Jul. 4, 2013

(30) Foreign Application Priority Data

Dec. 29, 2011 (KR) .................. 10-2011-0146365

(51) Int. Cl.

| | |
|---|---|
| *B82Y 20/00* | (2011.01) |
| *G02B 1/04* | (2006.01) |
| *G02B 6/00* | (2006.01) |
| *F21V 8/00* | (2006.01) |
| *G02F 1/1335* | (2006.01) |

(52) U.S. Cl.
CPC .............. *G02B 6/005* (2013.01); *G02F 1/1336* (2013.01); *B82Y 20/00* (2013.01); *G02B 1/045* (2013.01); *G02B 6/0065* (2013.01); *G02F 1/133615* (2013.01); *G02F 2001/133614* (2013.01); *G02F 2202/022* (2013.01); *G02F 2202/36* (2013.01); *Y10S 977/778* (2013.01); *Y10S 977/952* (2013.01)

(58) Field of Classification Search
None
See application file for complete search history.

(56) References Cited

U.S. PATENT DOCUMENTS

| | | |
|---|---|---|
| 2002/0018632 A1 | 2/2002 | Pelka |
| 2006/0103589 A1 | 5/2006 | Chua et al. |

(Continued)

FOREIGN PATENT DOCUMENTS

| | | |
|---|---|---|
| KR | 1020100069087 A | 6/2010 |
| KR | 1020100129030 A | 12/2010 |

OTHER PUBLICATIONS

Smith, A.M. et al., Nanocrystal Synthesis in an Amphibious Bath: Spontaneous Generation of Hydrophilic and Hydrophobic Surface Coatings, Angew Chem Int Ed Engl. 2008, 47(51): 9916-9921. DOI: 10.1002/anie.200804179.

*Primary Examiner* — Ramsey Zacharia

(74) *Attorney, Agent, or Firm* — Cantor Colburn LLP

(57) ABSTRACT

A backlight unit for a liquid crystal display device including an light emitting diode light source; a light conversion layer disposed apart from the light emitting diode light source, wherein the light conversion layer is configured to convert light emitted from the light emitting diode light source to white light and provide the white light to a liquid crystal panel; and a light guide panel disposed between the light emitting diode light source and the light conversion layer, wherein the light conversion layer includes a semiconductor nanocrystal and a polymer matrix, wherein the semiconductor nanocrystal is coated with a first polymer, and wherein the polymer matrix comprises a thermoplastic second polymer.

26 Claims, 7 Drawing Sheets

(56) References Cited

U.S. PATENT DOCUMENTS

| | | |
|---|---|---|
| 2008/0088225 A1 | 4/2008 | Weiss et al. |
| 2008/0149164 A1 | 6/2008 | Goedmakers et al. |
| 2010/0283072 A1 | 11/2010 | Kazlas et al. |
| 2011/0037925 A1* | 2/2011 | Park et al. .................. 349/64 |

* cited by examiner

BACKLIGHT UNIT AND LIQUID CRYSTAL DISPLAY INCLUDING SAME

CROSS-REFERENCE TO RELATED APPLICATION

This application claims priority to Korean Patent Application No. 10-2011-0146365, filed on Dec. 29, 2011, and all the benefits accruing therefrom under 35 U.S.C. §119, the content of which of which in its entirety is herein incorporated by reference.

BACKGROUND

1. Field

This disclosure relates to a backlight unit and a liquid crystal display device including the same.

2. Description of the Related Art

Liquid crystal display ("LCD") devices form an image by receiving external light, unlike plasma display panels ("PDPs") and field emission displays ("FEDs") which form an image using self-emitting light. Thus, the LCD devices require a backlight unit for emitting light on the back surface thereof.

As for the backlight unit for an LCD device, a cold cathode fluorescent lamp ("CCFL") has been used as a light source. However, when the CCFL is used as a light source, it may be difficult to provide uniform luminance and color purity may deteriorate when the LCD device has a large screen.

As a result, a backlight unit which uses three color light emitting diodes ("LEDs") as a light source has been recently developed. Since the backlight unit using the three color LEDs as the light source provides improved color purity, as compared to the backlight unit using the CCFL, it is used in a higher quality display device, for example. However, the backlight unit using three color LEDs as a light source costs more than the backlight unit using the CCFL as a light source. To reduce cost, use of a white LED which emits light by converting light emitted from a single color LED chip to white light has been proposed.

However, although the white LED is not as expensive as the three color LEDs, color purity and color reproducibility are reduced compared to color purity and color reproducibility of an LCD device including the three color LEDs. Accordingly, there remains a need for a lower cost light source capable of providing improved color purity and color reproducibility.

SUMMARY

An embodiment of this disclosure provides a backlight unit ("BLU") for a liquid crystal display device including a light emitting diode ("LED") light source.

Another embodiment of this disclosure provides a liquid crystal display device including the backlight unit.

According to an embodiment of this disclosure, provided is a backlight unit for a liquid crystal display device that includes: a light emitting diode ("LED") light source;

a light conversion layer disposed apart from the LED light source, wherein the light conversion layer is configured to convert light emitted from the LED light source to white light and to provide the which light to a liquid crystal panel; and a light guide panel disposed between the LED light source and the light conversion layer, wherein the light conversion layer includes a semiconductor nanocrystal and a polymer matrix, wherein the semiconductor nanocrystal is coated with a first polymer selected from a polymer having a carboxylic acid group (—C(=O)OH), a monovalent salt thereof (—C(=O)O⁻M⁺, wherein M is a monovalent cation), a multivalent salt thereof (—C(=O)O⁻(M^{x+})_{(1/x)}, wherein M is a cation having a valence of x wherein x is two or more), and a combination thereof, and the polymer matrix includes a thermoplastic second polymer selected from a polyolefin; a cyclic olefin polymer ("COP"); a polymer comprising a carboxylic acid group (—C(=O)OH), a monovalent salt thereof (—C(=O)O⁻M⁺, wherein M is a monovalent cation), a multivalent salt thereof (—C(=O)O⁻(M^{x+})_{(1/x)}, wherein M is a cation having a valence of x wherein x is two or more), and a combination thereof; a polyamide; a polyimide; a polyamideimide; a polyetherimide; a polyacrylonitrile; a polyarylene ether; a polyarylene sulfide; a polyarylene sulfone; a polybenzoxazole; polybenzothiazole; a polybutadiene; a polycarbonate; a polycarbonate ester; a polyether ketone; a polyether ether ketone; a polyether ketone ketone; a polyethersulfone; a polyisoprene; a polyphosphazene; a polystyrene; a rubber-modified polystyrene; a polyoxadiazole; a polysilazane; polysulfone; a polysulfonamide; a polyvinyl acetate; a polyvinyl chloride; a polyvinyl ester; a polyvinyl ether; a polyvinyl halide; a polyvinyl nitrile; a polyvinyl thioether; a polyurea; a polyurethane; an epoxy; an ethylene propylene diene rubber; an ethylene propylene diene monomer rubber; a silicone; and a combination thereof.

The backlight unit may further include at least one selected from a diffusion plate, a prism sheet, a microlens sheet, and a brightness enhancement layer, disposed on the light guide panel, and the light conversion layer may be disposed between at least two selected from the light guide, the diffusion plate, the prism sheet, microlens sheet, and the brightness enhancement layer. The LED light source may be disposed on a side of the light conversion layer.

The semiconductor nanocrystal may be selected from a Group II-VI compound, a Group III-V compound, a Group IV-VI compound, a Group IV element, a Group IV compound, and a combination thereof.

The semiconductor nanocrystal may have a full width at half maximum ("FWHM") of less than or equal to about 45 nanometers (nm) in a light emitting wavelength spectrum.

The polymer having the carboxylic acid group or the salt thereof may be selected from a polyacrylic acid, a polymethacrylic acid, a poly(alkylene-co-acrylic acid), a poly (alkylene-co-methacrylic acid), a salt thereof, and a combination thereof.

The polymer having the carboxylic acid group, or the salt thereof, may be a polymer including an alkylene structural unit and a structural unit represented by the following Chemical Formula 1.

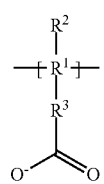

Chemical Formula 1

In Chemical Formula 1, $R^1$ is a substituted or unsubstituted C2 to C20 alkylene group, $R^2$ is selected from hydrogen; a substituted or unsubstituted C1 to C10 alkyl group, $R^3$ is selected from a substituted or unsubstituted C1 to C50 alkylene group; a substituted or unsubstituted C2 to C50 alkenylene group; a C1 to C50 alkylene group wherein at least one methylene group (—CH$_2$—) replaced by a group selected from a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), an —NR— group (wherein R is hydrogen or a C1 to C10 alkyl group), and a combination thereof; and a C2 to C50 alkenylene group wherein at least one methylene group (—CH$_2$—) replaced by a group selected from a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), an —NR— group (wherein R is hydrogen or a C1 to C10 alkyl group), and a combination thereof.

The monovalent salt may comprise a monovalent cation, wherein the monovalent cation may be a cation of a metal, wherein the metal is an alkali metal, for example, a cation of a metal selected from Li, Na, K, Rb, Cs, and a combination thereof, in particular Na, K, Rb, and a combination thereof.

The cation having a valence x wherein x is two or more, may be a cation of a metal selected from an alkaline-earth metal, a rare earth element, a transition element, a Group 12 element, a Group 13 element, and a combination thereof, for example, a cation of a metal selected from Mg, Ca, Ba, Sc, Y, Ti, V, Cr, Mn, Fe, Co, Ni, Cu, Ga, Sr, Zr, Nb, Mo, Au, Zn, Cd, Hg, In, Tl, and a combination thereof.

The light conversion layer may further include an inorganic oxide.

The converted white light emitted from the light conversion layer may have a Cx color coordinate ranging from about 0.20 to about 0.50 and a Cy color coordinate ranging from about 0.18 to about 0.42 in a CIE 1931 chromaticity diagram. The LED light source may be a blue LED light source, and the light conversion layer may include a green light emitting semiconductor nanocrystal and a red light emitting semiconductor nanocrystal in a weight ratio of about 6:1 to about 11:1, based on the total weight of the semiconductor nanocrystals.

The light conversion layer may include a plurality of layers which have a light emitting wavelength of lower energy in a direction toward the LED light source.

The light conversion layer may include the semiconductor nanocrystal coated with the first polymer and the polymer matrix including the thermoplastic second polymer; and may further include first and second polymer layers disposed on at least one surface of the light conversion layer wherein the first and second polymer layers each independently may include a polymer selected from a polyester, a cyclic olefin polymer ("COP"), a polymerized product of a first monomer including at least two thiol (—SH) groups at a terminal end and a second monomer including at least two carbon-carbon unsaturated bond-containing groups at a terminal end, and a combination thereof.

At least one of the first and second polymer layers may further include an inorganic oxide.

At least one of the first and second polymer layers may have a concavo-convex pattern on a surface opposite the light conversion layer.

According to another embodiment, provided is a liquid crystal display device that includes
a light emitting diode ("LED") light source;
a light conversion layer disposed apart from the LED light source, wherein the light conversion layer is configured to convert light emitted from the LED light source to white light and to provide the white light to a liquid crystal panel;
a light guide panel disposed between the LED light source and the light conversion layer; and
a liquid crystal panel, which is configured to provide an image using light received from the light conversion layer, wherein
the light conversion layer includes a semiconductor nanocrystal and a polymer matrix, and
the semiconductor nanocrystal is coated with a first polymer selected from a polymer having a carboxylic acid group (—C(=O)OH), a monovalent salt thereof (—C(=O)O$^-$M$^+$, wherein M is a monovalent cation), a multivalent salt thereof (—C(=O)O$^-$(M$^{x+}$)$_{(1/x)}$, wherein M is a cation having a valence of x wherein x is two or more), and a combination thereof,
the polymer matrix includes a thermoplastic second polymer selected from a polyolefin; a cyclic olefin polymer ("COP"); a polymer comprising a carboxylic acid group (—C(=O)OH), a monovalent salt thereof (—C(=O)O$^-$M$^+$, wherein M is a monovalent cation), a multivalent salt thereof (—C(=O)O$^-$(M$^{x+}$)$_{(1/x)}$, wherein M is a cation having a valence of x wherein x is two or more), and a combination thereof; a polyamide; a polyimide; a polyamideimide; a polyetherimide; a polyacrylonitrile; a polyarylene ether; a polyarylene sulfide; a polyarylene sulfone; a polybenzoxazole; polybenzothiazole; a polybutadiene; a polycarbonate; a polycarbonate ester; a polyether ketone; a polyether ether ketone; a polyether ketone ketone; a polyethersulfone; a polyisoprene; a polyphosphazene; a polystyrene; a rubber-modified polystyrene; a polyoxadiazole; a polysilazane; polysulfone; a polysulfonamide; a polyvinyl acetate; a polyvinyl chloride; a polyvinyl ester; a polyvinyl ether; a polyvinyl halide; a polyvinyl nitrile; a polyvinyl thioether; a polyurea; a polyurethane; an epoxy; an ethylene propylene diene rubber; an ethylene propylene diene monomer rubber; a silicone; and a combination thereof.

BRIEF DESCRIPTION OF THE DRAWINGS

The above and other aspects, advantages and features of this disclosure will become more apparent by describing in further detail embodiments thereof with reference to the accompanying drawings, in which.

DETAILED DESCRIPTION

Figure 1:
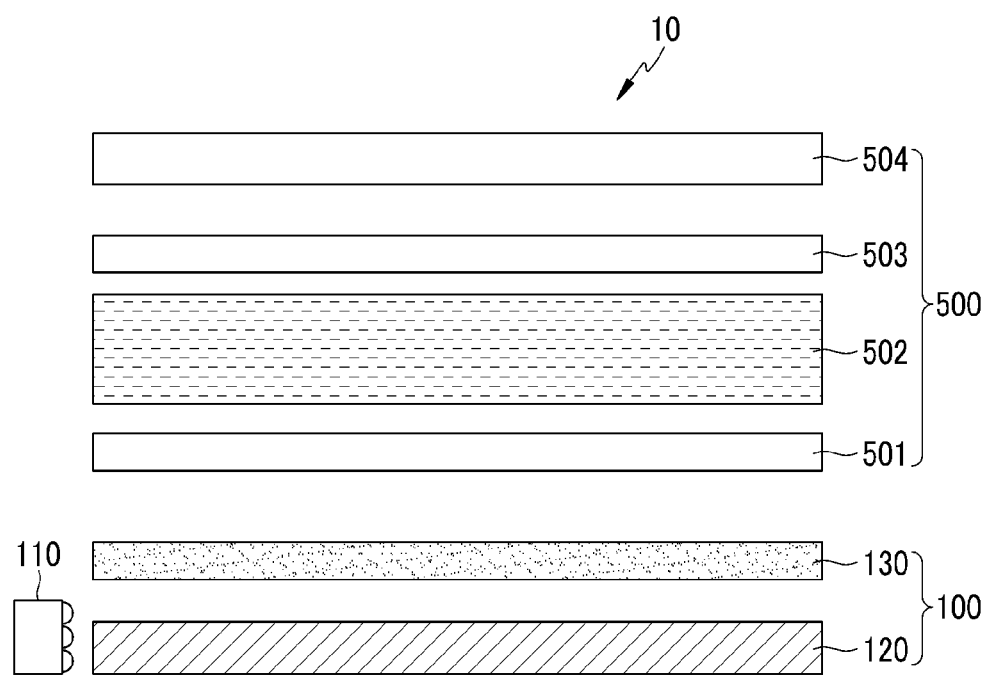
FIG. 1 is a schematic view showing an embodiment of a liquid crystal display device.

This disclosure will be described more fully hereinafter with reference to the accompanying drawings, in which various embodiments are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the thickness of layers, films, panels, regions, etc., are exaggerated for clarity. Like reference numerals refer to like elements throughout.

It will be understood that when an element such as a layer, film, region, or substrate is referred to as being "disposed on" another element, it can be directly on the other element or intervening elements may also be present. In contrast, when an element is referred to as being "directly on" or "in contact with" another element, there are no intervening elements present.

The terminology used herein is for the purpose of describing particular embodiments only and is not intended to be limiting. As used here, the singular forms "a", "an" and "the" are intended to include the plural forms as well, including "at least one," unless the content clearly indicates otherwise. "Or" means "and/or." It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a definition is not otherwise provided, the term "substituted" refers to a compound or group substituted with a substituent selected from a C1 to C30 alkyl group, a C2 to C30 alkynyl group, a C6 to C30 aryl group, a C7 to C30 alkylaryl group, a C1 to C30 alkoxy, a C6 to C30 aryloxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (specifically the halogens selected from —F, —Cl, —Br, or —I), a hydroxy group (—OH), a nitro group (—NO$_2$), a cyano group (—CN), an amino group (NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), a ester group (—C(=O)OR, wherein R is a C1 to C6 alkyl group, a C6 to C12 aryl group), a carboxylic acid group (—C(=O)OH), or a salt thereof, a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof, instead of hydrogen, provided that the substituted atom's normal valence is not exceeded.

As used herein, when a definition is not otherwise provided, the prefix "hetero" refers to a compound or a group that includes at least one heteroatom wherein the heteroatom is each independently N, O, S, Si, or P. Throughout the present disclosure, reference is made to various heterocyclic groups. Within such groups, the term "hetero" means a compound or a group that includes at least one ring member (e.g., 1 to 4 ring members) that is a heteroatom (e.g., 1 to 4 heteroatoms, each independently N, O, S, Si, or P). The total number of ring members may be 3 to 10. If multiple rings are present, each ring is independently aromatic, saturated, or partially unsaturated, and multiple rings, if present, may be fused, pendant, spirocyclic, or a combination thereof. Heterocycloalkyl groups include at least one non-aromatic ring that contains a heteroatom ring member. Heteroaryl groups include at least one aromatic ring that contains a heteroatom ring member. Non-aromatic and/or carbocyclic rings may also be present in a heteroaryl group, provided that at least one ring is both aromatic and contains a ring member that is a heteroatom.

An "alkyl" group is a straight or branched saturated aliphatic hydrocarbon group having the specified number of carbon atoms and having a valence of at least one, optionally substituted with one or more substituents where indicated, provided that the valence of the alkyl group is not exceeded.

An "alkenyl" group is a straight or branched chain hydrocarbon that comprises at least one carbon-carbon double bond and having a valence of at least one, optionally substituted with one or more substituents where indicated, provided that the valence of the alkenyl group is not exceeded.

An "alkynyl" group is a straight or branched chain, monovalent hydrocarbon group having at least one carbon-carbon triple bond (e.g., ethynyl).

As used herein, the term "alkylene group" refers to a straight or branched saturated aliphatic hydrocarbon group having a valence of at least two, optionally substituted with one or more substituents where indicated, provided that the valence of the alkylene group is not exceeded.

An "aryl" group is a cyclic group in which all ring members are carbon and at least one ring is aromatic, the group having the specified number of carbon atoms, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

The term "arylene" group refers to a divalent radical formed by the removal of two hydrogen atoms from one or more rings of an aromatic hydrocarbon, wherein the hydrogen atoms may be removed from the same or different rings, each of which rings may be aromatic or nonaromatic.

An "alkylaryl" group is an alkyl group as defined above, covalently linked to a substituted or unsubstituted aryl group, as defined above, with the point of attachment to a compound on the aryl group.

An "alkoxy" group is an alkyl group as defined above, linked via an oxygen, e.g. alkyl-O—.

An "aryloxy" group is an aryl group as defined above, linked via an oxygen, e.g. aryl-O—.

As used herein, the term "aliphatic organic group" refers to a linear or branched C1 to C30 alkyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group, or a C3 to C30 cycloalkynyl group.

A "carbonylalkyl" group is an alkyl group as defined above, linked via a carbonyl group, and a "carbonylalkoxy" group is an alkoxy group as defined above, linked via a carbonyl group.

A "cycloalkyl" group is a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified (e.g., C3 to C15 cycloalkyl), the number means the number of ring members present in the one or more rings.

A "cycloalkenyl" group is monovalent group having one or more rings and one or more carbon-carbon double bond in the ring, wherein all ring members are carbon (e.g., cyclopentyl and cyclohexyl).

A "cycloalkynyl" group is a stable aliphatic monocyclic or polycyclic group having at least one carbon-carbon triple bond, wherein all ring members are carbon (e.g., cyclohexynyl).

As used herein, the term "carbon-carbon unsaturated bond-containing substituent" includes a C2 to C20 alkenyl group including at least one carbon-carbon double bond, a C2 to C20 alkynyl group including at least one carbon-carbon triple bond, a C4 to C20 cycloalkenyl group including at least one carbon-carbon double bond in a ring, or a C4 to C20 cycloalkynyl group including at least one carbon-carbon triple bond in a ring.

As used herein, the term "combination thereof" refers to a mixture, a stacked structure, a composite, an alloy, a blend, a reaction product, or the like.

A "heteroalkyl" group is an alkyl group as defined above, that comprises at least one heteroatom covalently bonded to one or more carbon atoms of the alkyl group. Each heteroatom is independently chosen from N, O, S, Si, or P.

"Heteroaralkyl" refers to an alkyl group as defined above in which one of the hydrogen atoms of the alkyl is replaced by a heteroaryl group.

"Heteroaryl" refers to a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, Spiro or fused. The heteroatom(s) are independently chosen from N, O, S, Si, or P.

"Heteroarylalkyl" refers to a heteroaryl group as defined above, linked via an alkylene moiety, as defined above. The specified number of carbon atoms (e.g., C3 to C30) means the total number of carbon atoms present in both the aryl and the alkylene moieties, with remaining ring atoms being heteroatoms as defined above.

"Heteroarylene" refers to a divalent radical formed by the removal of two hydrogen atoms from one or more rings of a heteroaryl moiety, as defined above, wherein the hydrogen atoms may be removed from the same or different rings (preferably the same ring), each of which rings may be aromatic or nonaromatic.

As used herein, (meth)acrylate refers to acrylate and methacrylate and (meth)acryloxy refers to acryloxy and methacryloxy.

As used herein, a "structural unit" refers to a repeat unit in a polymer.

As used herein, the term "thermoplastic polymer" refers to a macromolecular structure that repeatedly softens when heated and hardens when cooled. Non-limiting illustrative examples of thermoplastic polymeric materials include one or more of olefin-derived polymers, for example, polyethylene, polypropylene, and their copolymers; polymethylpentane-derived polymers, for example, polybutadiene, polyisoprene, and their copolymers; polymers of unsaturated carboxylic acids and their functional derivatives, for example, acrylic polymers such as poly(alkyl acrylates), poly(alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-66, nylon-11, and nylon-12; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketones; or blends or copolymers thereof. The thermoplastic polymer may be a blend of polymers, copolymers, terpolymers, or combinations comprising at least one of the foregoing thermoplastic polymers. The thermoplastic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing thermoplastic polymers.

Hereinafter, referring to the drawings, a backlight unit according to an embodiment and a liquid crystal display device including the same are described in further detail.

FIG. 1 is a schematic view showing a liquid crystal display device 10 including a backlight unit according to an embodiment.

Referring to FIG. 1, the liquid crystal display device 10 includes a backlight unit and a liquid crystal panel which forms a predetermined colored image using white light provided from the backlight unit.

The backlight unit includes a light emitting diode ("LED") light source 110, a light conversion layer 130 which converts light emitted from the LED light source 110 into white light, and a light guide panel 120 disposed there between to guide the light emitted from the LED light source 110 toward the light conversion layer 130. The LED light source 110 includes a plurality of LED chips emitting light having a predetermined wavelength. The LED light source 110 may be a blue light-emitting LED light source or an ultraviolet ("UV")-emitting LED light source.

The liquid crystal panel may include a first polarizer 501, a liquid crystal layer 502, a second polarizer 503, and a color filter 504, which may be sequentially disposed on the backlight unit.

A reflector (not shown) may be further disposed on a lower surface of the light guide panel 120.

The light conversion layer 130 is disposed apart from the LED light source and may be disposed on and separate from the LED light source 110. The light conversion layer 130 converts light emitted from the LED light source 110 to white light and thus provides the white light to the liquid crystal panel.

According to an embodiment, the light conversion layer 130 includes a semiconductor nanocrystal and a polymer matrix. The light conversion layer has excellent and improved color reproducibility and color purity, due to the semiconductor nanocrystal.

The semiconductor nanocrystal may be selected from a Group II-VI compound, a Group III-V compound, a Group IV-VI compound, a Group IV element, a Group IV compound, and a combination thereof, wherein the term "Group" refers to a group of the Periodic Table of the Elements.

The Group II-VI compound includes a binary compound selected from CdSe, CdTe, ZnS, ZnSe, ZnTe, ZnO, HgS, HgSe, HgTe, MgSe, MgS, and a combination thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof. The Group III-V compound includes a binary compound selected from GaN, GaP, GaAs, GaSb, AlN, AlP, AlAs, AlSb, InN, InP, InAs, InSb, and a combination thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; or a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group IV-VI compound includes a binary compound selected from SnS, SnSe, SnTe, PbS, PbSe, PbTe, and a combination thereof; a ternary compound selected from SnSeS, SnSeTe, SnSTe, PbSeS, PbSeTe, PbSTe, SnPbS, SnPbSe, SnPbTe, and a combination thereof; or a quaternary compound selected from SnPbSSe, SnPbSeTe, SnPbSTe, and a combination thereof. The Group IV element may be selected from Si, Ge, and a combination thereof. The Group IV compound includes a binary compound selected from SiC, SiGe, and combination thereof.

According to an embodiment, the element, the binary compound, the ternary compound, or the quaternary compound may be present in a particle having a substantially uniform concentration or in a particle having different concentration distributions in the same particle. In addition, each particle may have a core/shell structure in which a first semiconductor nanocrystal is surrounded by a second semiconductor nanocrystal. The core and shell may have an interface, and an element of at least one of the core or the shell may have a concentration gradient that decreases in a direction from the surface of the particle to a center of the particle.

In addition, the semiconductor nanocrystal may have a structure including a semiconductor nanocrystal core and a multi-layer shell surrounding the same. The multi-layer shell may have a two or more layered shell structure. Each layer may have a single composition or an alloy or concentration gradient.

In addition, the semiconductor nanocrystal may have a structure effectively showing the quantum confinement effect, since the shell has a material composition with a higher energy band gap than that of the core. When the semiconductor nanocrystal has a multi-layered shell, the energy band gap of the shell disposed on the exterior of the core may be higher than the shell closer to the core.

The semiconductor nanocrystal may have quantum efficiency of about 30% to about 100%, for example, about 50% or more, or about 70% or more, or about 90% or more. Within this range, the semiconductor nanocrystal may improve the luminous efficiency of a device.

In addition, the full width of half maximum ("FWHM") of the light emitting wavelength spectrum of the semiconductor nanocrystal may be designed to be narrower or wider according to the application field. It may have a narrower spectrum in order to improve the color purity or the color reproducibility in a display. In this regard, the semiconductor nanocrystal may have a full width at half maximum ("FWHM") of less than or equal to about 45 nanometers ("nm"), specifically, less than or equal to about 40 nm, and more specifically, less than or equal to about 30 nm in the light emitting wavelength spectrum. Within the range, the light conversion layer 130 may improve the color purity or the color reproducibility of a device.

The semiconductor nanocrystal may have a particle diameter (e.g., an average largest particle diameter) ranging from about 1 nanometer ("nm") to about 100 nm, specifically, about 1 nm to about 50 nm, specifically, about 2 nm to about 25 nm, and more specifically about 1 nm to about 10 nm.

In addition, the nanocrystal may have a commonly-used shape in this art so the shape is not specifically limited. Examples thereof may include spherical, pyramidal, multi-armed, or cubic nanoparticles, nanotubes, nanowires, nanofiber, nanoplate particles, or the like.

The semiconductor nanocrystal may be synthesized according to the general methods known in this art.

The semiconductor nanocrystal is coated with a first polymer having a good affinity for the semiconductor nanocrystal, and dispersed in a polymer matrix, which comprises a thermoplastic second polymer having excellent or improved compatibility with the first polymer.

The first polymer is selected from a polymer comprising a carboxylic acid group (—C(=O)OH), a monovalent salt thereof (—C(=O)O$^-$M$^+$, wherein M is a monovalent cation), a multivalent salt thereof (—C(=O)O$^-$(M$^{x+}$)$_{(1/x)}$, wherein M is a cation having a valence of x wherein x is two or more), and a combination thereof. In particular, the first polymer may be selected from polyacrylic acid; a monovalent or multivalent salt thereof; polymethacrylic acid; a monovalent or multivalent salt thereof; other polymers having a carboxylic acid group (—C(=O)OH) or a monovalent or multivalent salt thereof a modified polymer including a polymer having a carboxylate anion group (—C(=O)O$^-$) and a metal cation (wherein the metal cation has a valence of at least two) bound to the carboxylate anion group as further described below; and a combination thereof. Herein, the term "coated" includes embodiments where a coating is disposed on, or disposed on and in contact with the partial or entire surface of the semiconductor nanocrystal with the first polymer.

The carboxylic acid group may be present in the first polymer as an acrylic acid group, a methacrylic acid group, or a salt of an acrylic acid or methacrylic acid group, and a combination thereof. As used herein, the term "a salt" includes a monovalent and a multivalent salt. The polymer having the carboxylic acid group or a salt thereof may include a structural unit including a carboxylic acid group or a salt thereof in a ratio of about 1 to about 100 mole percent (mol %), specifically about 1 to about 90 mol %, more specifically about 2 to about 50 mol %, and even more specifically about 4 to about 20 mol % in the polymer. When the structural unit including a carboxylic acid group or a salt thereof is included within the above range in the polymer, it may improve stability of the semiconductor nanocrystal.

The monovalent cation may be a cation of a metal, wherein the metal is an alkali metal, for example, a cation of a metal selected from Li, Na, K, Rb, Cs, and a combination thereof, specifically Na, K, Rb, and a combination thereof.

The polymer having a carboxylic acid group, or a salt thereof may be a copolymer including a polyalkylene structural unit and a poly(meth)acrylic acid structural unit. The polyalkylene structural unit may include a substituted or unsubstituted C2 to C36 alkylene group, a substituted or unsubstituted C2 to C18 alkylene group, or a C2 to C12 alkylene group. These structural units may be randomly arranged to provide a random copolymer or arranged as a block to provide a block copolymer, without limitation. Therefore, the polymer having a carboxylic acid group or a salt thereof may be selected from a poly(alkylene-co-acrylic acid), a poly(alkylene-co-methacrylic acid), a salt thereof, and a combination thereof. In an embodiment, the polymer having a carboxylic acid group or a salt thereof may be selected from a poly(ethylene-co-acrylic acid), a poly(ethylene-co-methacrylic acid), a poly(propylene-co-acrylic acid), a poly(propylene-co-methacrylic acid), a poly(butylene-co-acrylic acid), a poly(butylene-co-methacrylic acid), a monovalent salt thereof, and a combination thereof.

In an embodiment, the first polymer may be a polymer including an alkylene structural unit and a structural unit represented by the following Chemical Formula 1. The polyalkylene structural unit may include a substituted or unsubstituted C2 to C36 alkylene group, a substituted or unsubstituted C2 to C18 alkylene group, or a substituted or unsubstituted C2 to C12 alkylene group. These structural units may be randomly arranged to provide a random copolymer or arranged as a block to provide a block copolymer, without limitation.

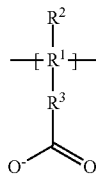

Chemical Formula 1

In Chemical Formula 1, $R^1$ is a substituted or unsubstituted C2 to C20 alkylene group, for example a substituted or unsubstituted C2 to C10 alkylene group, or a C2 to C6 alkylene group, $R^2$ is selected from hydrogen; a substituted or unsubstituted C1 to C10 alkyl group, $R^3$ is selected from a substituted or unsubstituted C1 to C50 alkylene group; a substituted or unsubstituted C2 to C50 alkenylene group; a C1 to C50 alkylene group wherein at least one methylene group ($-CH_2-$) is replaced by a group selected from a sulfonyl group ($-S(=O)_2-$), a carbonyl group ($C(=O)-$), an ether group ($-O-$), a sulfide group ($-S-$), a sulfoxide group ($-S(=O)-$), an ester group ($-C(=O)O-$), an amide group ($-C(=O)NR-$) (wherein R is hydrogen or a C1 to C10 alkyl group), an $-NR-$ group (wherein R is hydrogen or a C1 to C10 alkyl group), and a combination thereof; and a C2 to C50 alkenylene group wherein at least one methylene group ($-CH_2-$) is substituted with a sulfonyl group ($-S(=O)_2-$), a carbonyl group ($-C(=O)-$), an ether group ($-O-$), a sulfide group ($-S-$), a sulfoxide group ($-S=O-$), an ester group ($-C(=O)O-$), an amide group ($-C(=O)NR-$) (wherein R is hydrogen or a C1 to C10 alkyl group), an $-NR-$ group (wherein R is hydrogen or a C1 to C10 alkyl group), or a combination thereof.

The first polymer including a structural unit represented by Chemical Formula 1 may include the structural unit represented by Chemical Formula 1 in a ratio of about 1 to about 100 mol %, specifically about 1 to about 90 mol %, more specifically about 2 to about 50 mol %, and even more specifically about 4 to about 20 mol % in the polymer. When the structural unit of Chemical Formula 1 is included within the above range, it may improve stability of the semiconductor nanocrystal.

In any of the foregoing first polymers, the cation may be a multivalent cation. In this embodiment the multivalent cations provide intramolecular and intermolecular bonding between the carboxylate anion groups of the polymers through a coordination bond or an ionic bond. Such increased bonding in the first polymers coated on the semiconductor nanocrystal may provide a dense network. In addition, the coating network may be denser since polymers that have no covalent bond or ionic bond with the multivalent cation may be detached from the semiconductor nanocrystal during the coating.

The cation having a valence x wherein x is two or more, may be a cation of a metal selected from an alkaline-earth metal, a rare earth element, a transition element, a Group 12 element, a Group 13 element, and a combination thereof, for example, a cation of a metal selected from Mg, Ca, Ba, Sc, Y, Ti, V, Cr, Mn, Fe, Co, Ni, Cu, Ga, Sr, Zr, Nb, Mo, Au, Zn, Cd, Hg, In, Tl, and a combination thereof.

The first polymer may be coated in an amount of about 50 parts by weight to about 10,000 parts by weight based on 100 parts by weight of semiconductor nanocrystal and specifically, about 100 parts by weight to about 1,000 parts by weight. When the first polymer is coated within the range, it may sufficiently secure stability of the semiconductor nanocrystal.

The first polymer may have a melting point ("$T_m$") ranging from about 50° C. to about 300° C., specifically about 60° C. to about 200° C., and more specifically about 70° C. to about 200° C. When the first polymer has a melting point within the range, it may stably coat the semiconductor nanocrystal.

In addition, the semiconductor nanocrystals coated with the first polymer may be dispersed in a second polymer, which is a polymer matrix. The semiconductor nanocrystals coated with the first polymer are not agglomerated with each another and maintain a predetermined distance and thus, may have excellent dispersity.

The second polymer of the polymer matrix may be a thermoplastic polymer selected from a polyolefin; a cyclic olefin polymer ("COP"); a polymer comprising a carboxylic acid group ($-C(=O)OH$), a monovalent salt thereof ($-C(=O)O^-M^+$, wherein M is a monovalent cation), a multivalent salt thereof ($-C(=O)O^-(M^{x+})_{(1/x)}$, wherein M is a cation having a valence of x wherein x is two or more), and a combination thereof; a polyamide; a polyimide; a polyamideimide; a polyetherimide; a polyacrylonitrile; a polyarylene ether; a polyarylene sulfide; a polyarylene sulfone; a polybenzoxazole; a polybenzothiazole; a polybutadiene; a polycarbonate; a polycarbonate ester; a polyether ketone; a polyether ether ketone; a polyether ketone ketone; a polyethersulfone; a polyisoprene; a polyphosphazene; a polystyrene; a rubber-modified polystyrene; a polyoxadiazole; a polysilazane; a polysulfone; a polysulfonamide; a polyvinyl acetate; a polyvinyl chloride; a polyvinyl ester; a polyvinyl ether; a polyvinyl halide; a polyvinyl nitrile; a polyvinyl thioether; a polyurea; an epoxy;

an ethylene propylene diene rubber; an ethylene propylene diene monomer rubber; a silicone; and a combination thereof.

The polyolefin may be selected from polyethylene, polypropylene, polybutylene, and a combination thereof. The cyclic olefin polymer refers to a polymer obtained by chain copolymerization of cyclic monomers such as norbornene or tetracyclododecene with linear olefin monomers such as ethylene, propylene, or butylene.

The polymer having a carboxylic acid group, or a salt thereof, is the same as described in the first polymer.

The second polymer as a polymer matrix has excellent compatibility with an organic ligand on the surface of semiconductor nanocrystals or the first polymer coated on the semiconductor nanocrystal and thus, may well-disperse the semiconductor nanocrystals. The first polymer may be the same as or different from the second polymer. When the first polymer is same as the second polymer, the first polymer may be coated at the same time as the second polymer, and may be dispersed in a single process. According to an embodiment of this disclosure, the first polymer and the second polymer may be different, where the first polymer may include a polymer comprising a carboxylic acid group (—C(=O)OH), a monovalent salt thereof (—C(=O)O$^-$M$^+$, wherein M is a monovalent cation), a multivalent salt thereof (—C(=O)O$^-$ (M$^{x+}$)$_{(1/x)}$, wherein M is a cation having a valence of x wherein x is two or more), and a combination thereof, while the second polymer may include a polyolefin, a polyacrylic acid, or a polymethacrylic acid, but is not limited thereto.

Since the first and second polymers are thermoplastic, the semiconductor nanocrystal coated with the first polymer is mixed with the second polymer and the mixture is fabricated into a layer using a method such as hot pressing, melt casting, extrusion, and the like. The first polymer forms a dense polymer network and may stably protect the semiconductor nanocrystal. Accordingly, the semiconductor nanocrystal coated with the first polymer may stably maintain luminous efficiency for a long time.

The light conversion layer 130 may be provided in a form of a film in which the semiconductor nanocrystals coated with the first polymer are dispersed in the second polymer.

The light conversion layer 130 may include semiconductor nanocrystals in an amount of about 0.1 to about 20 percent by weight (wt %), specifically, about 0.2 to about 15 wt %, and more specifically, about 0.3 to about 10 wt % based on the entire amount of the light conversion layer 130. The light conversion layer 130 may include the first and second polymers in the remaining amount thereof. When the semiconductor nanocrystal and the first and second polymers are used within the range, a well dispersed light conversion layer 130 may be provided.

The light conversion layer 130 may further include an inorganic oxide selected from silica, alumina, titania, zirconia, and a combination thereof. Such an inorganic oxide may act as a light diffusion material. The inorganic oxide may be included in an amount of about 1 wt % to about 20 wt % based on the total weight of the light conversion layer 130. Within the above range, a light diffusion effect may be sufficiently achieved.

When the light emitted from the LED light source 110 is passed through the light conversion layer 130 including the semiconductor nanocrystals, blue light, green light, and red light are mixed to emit white light. By changing the compositions and sizes of semiconductor nanocrystals in the light conversion layer 130, the blue, green, and red lights may be controlled to a desirable ratio so as to provide white light having excellent or improved color reproducibility and color purity. Such converted white light emitted from the light conversion layer may have color coordinates where Cx is about 0.20 to about 0.50 and Cy is about 0.18 to about 0.42 in a CIE 1931 chromaticity diagram.

For example, if the LED light source 110 is a blue LED light source, the light conversion layer 130 may include green and red light emitting semiconductor nanocrystals in a weight ratio of about 6:1 to about 11:1, based on the total weight of the semiconductor nanocrystals. The blue LED light source may have a light emitting peak wavelength ranging from about 430 nm to about 460 nm, the green light emitting semiconductor nanocrystal may have a light emitting peak wavelength ranging from about 520 nm to about 550 nm, and the red light emitting semiconductor nanocrystal may have a light emitting peak wavelength ranging from about 590 nm to about 640 nm.

In another embodiment, the light conversion layer 130 may include a plurality of layers. Accordingly, the plurality of layers may be disposed so that the energy of light emitting wavelength is decreased going toward the LED light source 110. For example, if the LED light source 110 is a blue LED light source, the light conversion layer 130 may include a red light conversion layer and a green light conversion layer that are sequentially stacked in a direction away from the LED light source 110.

Even though not shown in FIG. 1, the backlight unit may further comprise a first layer selected from a diffusion plate, a prism sheet, a microlens sheet, and a brightness enhancement layer (e.g., double brightness enhancement film ("DBEF")), and a combination thereof, disposed on the light conversion layer 130. In addition, the light conversion layer 130 may be disposed between at least two layers selected from a light guide panel, a diffusion plate, a prism sheet, a microlens sheet, and a brightness enhancement layer (e.g., a double brightness enhancement film ("DBEF")).

Figure 2:
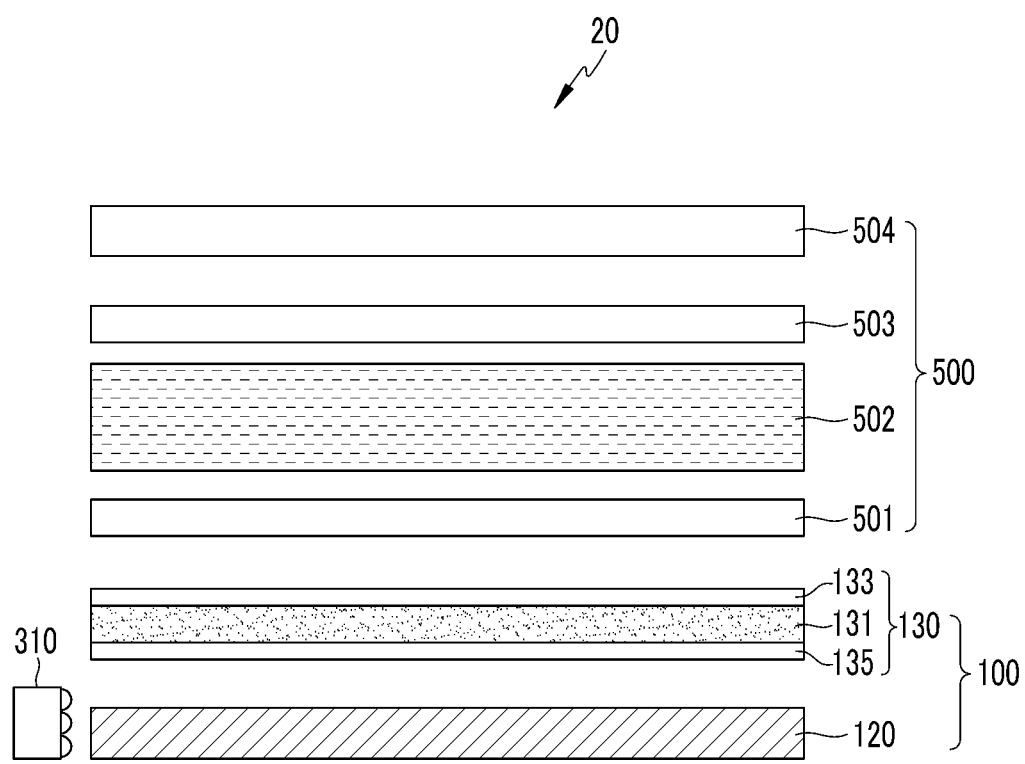
FIG. 2 is a schematic view of another embodiment of a liquid crystal display device.

FIG. 2 is a schematic view showing a liquid crystal display device 20 including the backlight unit and the liquid crystal panel, according to another embodiment of this disclosure. The backlight unit includes a LED light source 310, a light guide panel 120, and a light conversion layer which comprises a light conversion layer 131 interposed between a first polymer layer 133 and a second polymer layer 135. The LED light source 310 is disposed apart from the light guide panel 120.

The liquid crystal panel includes a first polarizer 501, a liquid crystal layer 502, a second polarizer 503, and a color filter 504, which are sequentially disposed on the backlight unit.

As shown in FIG. 2, the light conversion layer 131, which includes the semiconductor nanocrystal coated with the first polymer and the polymer matrix (the second polymer), is disposed between at least one of a first polymer layer 133 and a second polymer layer 135, which may be disposed on at least one surface of the light conversion layer 131. While not wishing to be bound by theory, it is believed the second polymer layer 135 disposed beneath the light conversion layer 131 may act as a barrier preventing degradation of the semiconductor nanocrystal due to the LED light source 310.

The first polymer layer 133 and the second polymer layer 135, may each independently include a polymer selected from a polyester, a cyclic olefin polymer ("COP"), a polymerized product of a first monomer including at least two thiol (—SH) groups at a terminal end, and a second monomer including at least two carbon-carbon unsaturated bond-containing groups at a terminal end, and a combination thereof. In an embodiment, each thiol group is located at a different terminal end. In an embodiment one or more of thiol groups are terminal groups, i.e., groups containing a moiety of the formula —SH, more specifically alkylthiol groups, i.e., groups containing a moiety of the formula —CH$_2$—SH. In an embodiment each carbon-carbon unsaturated bond-containing group is located at a different terminal end. In an embodiment one or more of the carbon-carbon unsaturated bond-containing groups are terminal groups, i.e., groups containing a moiety of the formula =CH$_2$, more specifically vinyl groups, i.e., groups containing a moiety of the formula —CH=CH$_2$.

The polyester may include a polyethyleneterephthalate, a polybutyleneterephthalate, a polyethylenenaphthalate, and the like. The cyclic olefin polymer refers to a polymer obtained by chain copolymerization of cyclic monomers such as norbornene, tetracyclododecene with linear olefin monomers such as ethylene, propylene, or butylene.

The polymerized product of the first monomer including at least two thiol (—SH) groups at a terminal end and a second monomer including at least two carbon-carbon unsaturated bond-containing groups at a terminal end may be a polymer of a first monomer including at least two thiol (—SH) groups at a terminal end represented by the following Chemical Formula 2 and a second monomer including at least two carbon-carbon unsaturated bond-containing groups at a terminal represented by the following Chemical Formula 3.

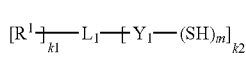

Chemical Formula 2

In Chemical Formula 2,

R$^1$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a double bond or triple bond in a ring; a substituted or unsubstituted C3 to C30 heterocycloalkyl group including a double bond or triple bond in a ring; a C3 to C30 alicyclic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxyl group; —NH$_2$; a substituted or unsubstituted C1 to C30 amine group (—NRR', wherein R and R' are independently hydrogen or a C1 to C20 alkyl group); an isocyanurate group; a (meth)acrylate group; a halogen; —ROR' (wherein R is a substituted or unsubstituted C1 to C20 alkylene group and R' is hydrogen or a C1 to C20 alkyl group); —C(=O)OR' (wherein R' is hydrogen or a C1 to C20 alkyl group); —CN; or —C(=O)ONRR' (wherein R and R' are independently hydrogen or a C1 to C20 alkyl group), L$_1$ is a single bond; a substituted or unsubstituted C1 to C30 alkylene group; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, Y$_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a group selected from a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), —NR— (wherein R is hydrogen or a C1 to C10 alkyl group), and a combination thereof, m is an integer of 1 or more, k1 is an integer of 0 or 1 or more, k2 is an integer of 1 or more, and the sum of m and k2 is an integer of 3 or more.

In the above Chemical Formula 2, m does not exceed the valance of Y$_1$, and k1 and k2 do not exceed the valence of the L$_1$. In an embodiment, the sum of m and k2 ranges from 3 to 6, specifically 3 to 5, and in another embodiment, m may be 1, k1 may be 0, and k2 may be 3 or 4.

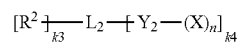

Chemical Formula 3

In Chemical Formula 3,

X is a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond, R$^2$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a double bond or triple bond in a ring; a substituted or unsubstituted C3 to C30 heterocycloalkyl group including a double bond or triple bond in a ring; a C3 to C30 alicyclic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxyl group; —NH$_2$; a substituted or unsubstituted C1 to C30 amine group (—NRR', wherein R and R' are independently hydrogen or a C1 to C30 alkyl group); an isocyanate group; an isocyanurate group; a (meth)acrylate group; a halogen; —ROR' (wherein R is a substituted or unsubstituted C1 to C20 alkylene group and R' is hydrogen or a C1 to C20 alkyl group); an acyl halide group (—RC(=O)X, wherein R is a substituted or unsubstituted alkylene group, and X is a halogen); —C(=O)OR' (wherein R' is hydrogen or a C1 to C20 alkyl group); —CN; or —C(=O)ONRR' (wherein R and R' are independently hydrogen or a C1 to C20 alkyl group), L$_2$ is a single bond, a substituted or unsubstituted C1 to C30 alkylene group, a substituted or unsubstituted C6 to C30 arylene group, or a substituted or unsubstituted C3 to C30 heteroarylene group, a substituted or unsubstituted C3 to C30 cycloalkylene group, or a substituted or unsubstituted C3 to C30 heterocycloalkylene group;

Y$_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)

NR—) (wherein R is hydrogen or a C1 to C10 alkyl group), —NR— (wherein R is hydrogen or a C1 to C10 alkyl group), or a combination thereof, n is an integer of 1 or more, k3 is an integer of 0 or 1 or more, k4 is an integer of 1 or more, and the sum of n and k4 is an integer of 3 or more.

In Chemical Formula 3, n does not exceed the valance of $Y_2$, and k3 and k4 does not exceed the valence of the $L_2$. In an embodiment, the sum of n and k4 may range from 3 to 6, specifically 3 to 5, and in another embodiment, n is 1, k3 is 0, and k4 is 3 or 4.

The first monomer of the above Chemical Formula 2 may include a monomer of the following Chemical Formulas 2-1 to 2-4.

Chemical Formula 2-1

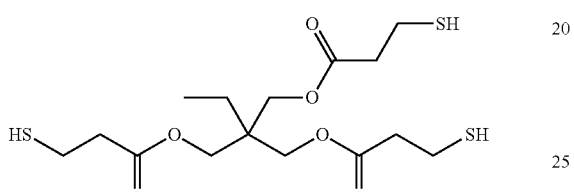

Chemical Formula 2-2

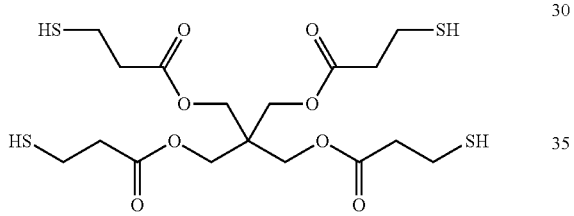

Chemical Formula 2-3

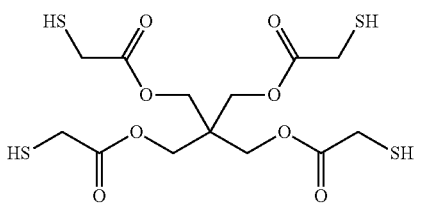

Chemical Formula 2-4

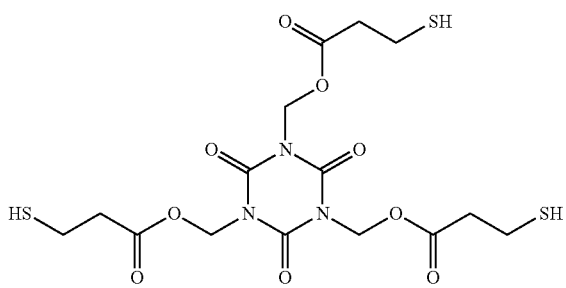

The second monomer of the above Chemical Formula 3 may include a monomer represented by the following Chemical Formulas 3-1 to 3-3.

Chemical Formula 3-1

Chemical Formula 3-2

Chemical Formula 3-3

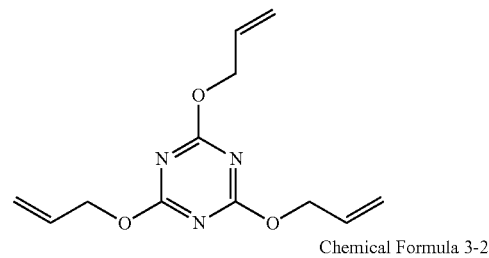

The polymer layer, including the first polymer layer 133 and the second polymer layer 135, may be formed to have a thickness of about 10 micrometers (μm) to about 250 μm, respectively.

At least one of the first polymer layer 133 and the second polymer layer 135 may further include an inorganic oxide. The inorganic oxide may be selected from silica, alumina, titania, zirconia, and a combination thereof. While not wishing to be bound by theory, it is believed the inorganic oxide may act as a light diffusion material. The inorganic oxide may be coated to have a thickness of about 10 nanometers (nm) to about 100 nm on a surface of the first polymer layer 133 and on a surface of the second polymer layer 135. The inorganic oxide may be included in an amount of about 1 percent by weight (wt %) to about 20 wt % based on the total amount of the polymer layer, for example each first and second polymer layers 133 and 135. In addition, when included within the range, the polymer layer is easily fabricated, moisture permeation may be decreased, and thus the polymer layer may substitute for a diffusion film. The polymer layer may have a concavo-convex pattern on a surface not contacting the first light conversion layer. The first polymer layer 133 may have a concavo-convex pattern having a predetermined size on a surface not contacting the light conversion layer 131 including the semiconductor nanocrystal coated with the first polymer and the polymer matrix including the thermoplastic second polymer. The second polymer layer 135 may also have a concavo-convex pattern having a predetermined size on a surface not contacting the light conversion layer 131 including the semiconductor nanocrystal coated with the first polymer and the polymer matrix including the thermoplastic second polymer. The first polymer layer 133 and the second polymer layer 135 with the concavo-convex pattern on the surfaces may diffuse light emitted from the LED light source 310, as shown in FIG. 2.

The first polymer layer 133 and the second polymer layer 135 may have an oxygen transmission ranging from about 0.01 cubic centimeter per meter squared per day at atmospheric pressure ($cm^3/m^2 \cdot day \cdot atm$) to about 10 $cm^3/m^2 \cdot day \cdot atm$ and a water vapor transmission rate ranging from about 0.001 grams per meter squared per day ($g/m^2 \cdot day$) to about 10 $g/m^2 \cdot day$. When the first polymer layer 133 and the second polymer layer 135 has the oxygen permeation and the water vapor permeation within the range, the semiconductor nanocrystal may be stably protected against external conditions.

Even though not shown in FIG. 2, the backlight unit may further comprise at least one selected from a diffusion plate, a prism sheet, a microlens sheet, and a brightness enhancement layer (e.g., a double brightness enhancement film ("DBEF")), which may be disposed on the light conversion layer 131. In addition, the light conversion layer 131 may be disposed between at least two selected from a light guide panel, a diffusion plate, a prism sheet, a microlens sheet, and a brightness enhancement layer (e.g., a double brightness enhancement film ("DBEF")).

Figure 3:
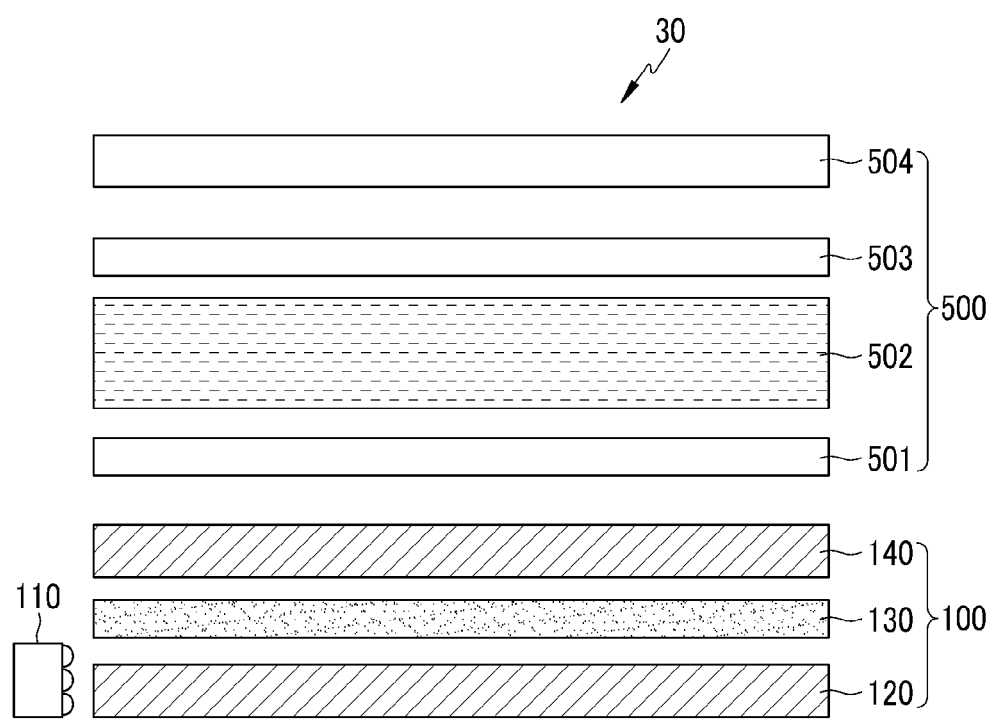
FIG. 3 is a schematic view of another embodiment of liquid crystal display device.

FIG. 3 is a schematic view showing a liquid crystal display device 30 further including a diffusion plate 140 disposed between the backlight unit, which comprises LED light source 110, the light conversion layer 130 and the light guide panel 120, and the liquid crystal panel, which comprises the first polarizer 501, the liquid crystal layer 502, the second polarizer 503, and the color filter 504.

The diffusion plate 140 diffuses and emits white light provided from the light conversion layer 130. Accordingly, while not wishing to be bound by theory, it is believed the diffusion plate 140 may improve uniformity of white light. Although FIG. 3 shows that the light conversion layer 130 is on and separate from the diffusion plate 140, the light conversion layer 130 may be disposed on and in contact with a surface of the diffusion plate 140.

Even though not shown in FIG. 3, at least one selected from a prism sheet, a microlens sheet, and a brightness enhancement layer (e.g., a double brightness enhancement film ("DBEF")) may be further disposed on the diffusion plate 140. In addition, the light conversion layer 130 may be disposed between at least two selected from a diffusion plate, a prism sheet, a microlens sheet, and a brightness enhancement layer (e.g., a double brightness enhancement film ("DBEF")).

Figure 4:
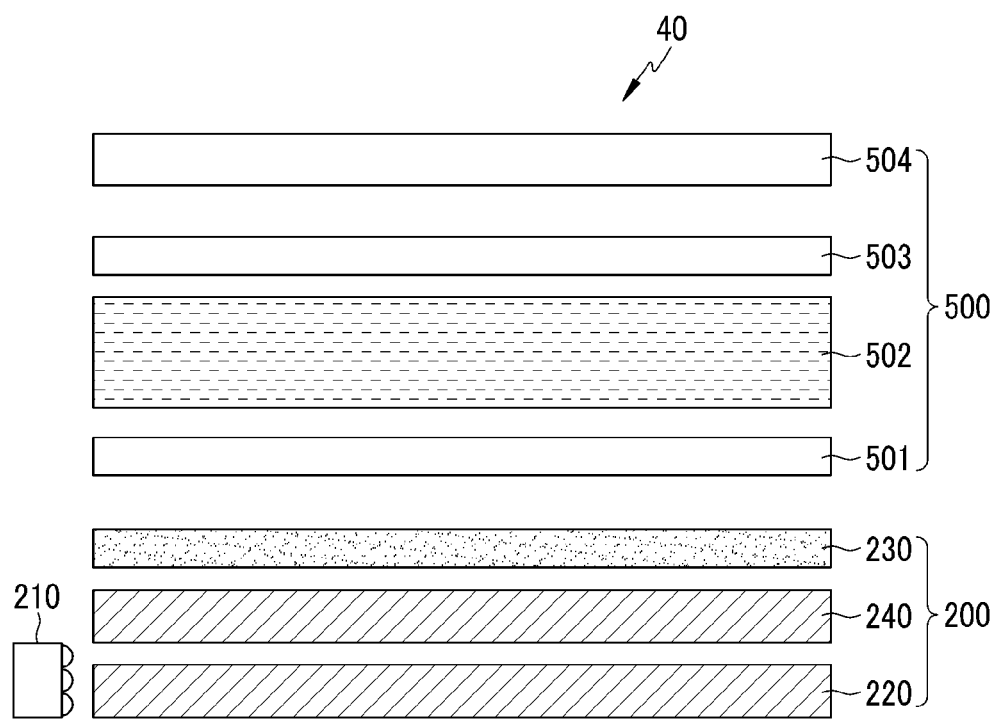
FIG. 4 is a schematic view of another embodiment of a liquid crystal display device.

FIG. 4 is a schematic view showing a liquid crystal display device 40 including a backlight unit 200 according to another embodiment of the present invention. The backlight unit 200 shown in FIG. 4 includes an LED light source 210, a light guide panel 220, a diffusion plate 240, and a light conversion layer 230.

The LED light source 210 includes a plurality of LED chips emitting light having a predetermined wavelength. The LED light source 210 may be an LED light source emitting blue light or an LED light source emitting ultraviolet ("UV").

The light guide panel 220 guides light emitted from the LED light source 210 into the light conversion layer 230. A reflector (not shown) may be further disposed on a lower surface of the light guide panel 220.

The light emitted from the LED light source 210 has improved uniformity, while it passes the diffusion plate 240 through the light guide panel 220.

The light conversion layer 230 is disposed on and separate, at a predetermined distance, from the LED light source 210, converts the light emitted from the LED light source 210 to white light, and emits the converted white light toward the liquid crystal panel.

The light conversion layer 230 includes a semiconductor nanocrystal and a polymer matrix. The light conversion layer has excellent and improved color reproducibility and color purity, due to the semiconductor nanocrystal. The semiconductor nanocrystal and the polymer matrix are the same as described for the light conversion layer 130 of FIG. 1.

The light conversion layer 230 may be disposed on and in contact with a surface of the diffusion plate 240, or the light conversion layer 230 may be disposed on and separate from the diffusion plate 240.

In an embodiment, a polymer layer may be disposed on a surface of the light conversion layer 230, of FIG. 4. In an embodiment, the first polymer layer 133 and the second polymer layer 135 as shown in FIG. 2, may be disposed on a surface of the light conversion layer 230, of FIG. 4.

In another embodiment, the light conversion layer 230 may include a plurality of layers. Accordingly, the plurality of layers may be disposed so that the energy of light emitting wavelength is decreased going toward the LED light source 210. For example, if the LED light source 210 is a blue LED light source, the light conversion layer 230 may include a red light conversion layer and a green light conversion layer sequentially stacked in a direction away from the LED light source 210.

The white light emitted from the backlight unit as shown in FIGS. 1 to 3, and the backlight unit 200 as shown in FIG. 4, is incident toward the liquid crystal panel. The liquid crystal panel forms a predetermined color image using the white light incident from the backlight unit. The liquid crystal panel may have a structure that includes a first polarizer 501, a liquid crystal layer 502, a second polarizer 503, and a color filter 504, which may be sequentially disposed. The white light emitted from the backlight unit is transmitted through the first polarizer 501, the liquid crystal layer 502, and the second polarizer 503 and then, injected into the color filter 504 to express a predetermined color image.

Figure 5:
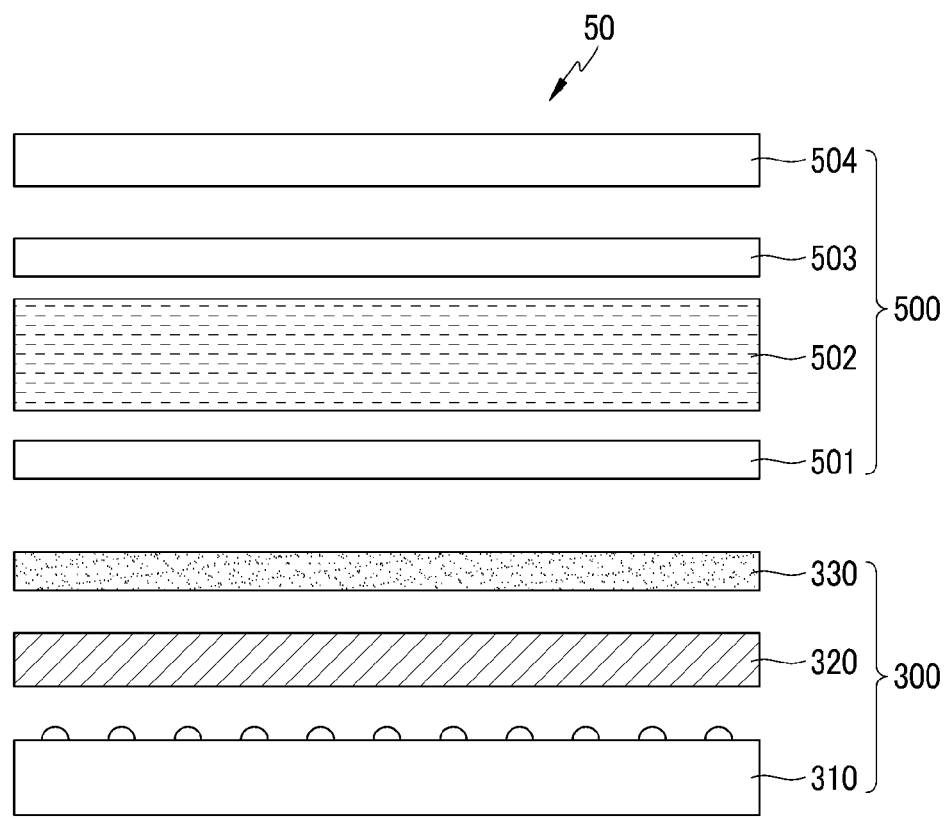
FIG. 5 is a schematic view of another embodiment of a liquid crystal display device.

FIG. 5 is a schematic view showing a liquid crystal display device 50 including the backlight unit 300 according to further another embodiment. Hereinafter, described are different aspects of this embodiment, from those described in the above embodiments.

Referring to FIG. 5, the backlight unit 300 according to further another embodiment includes an LED light source 310 and a light conversion layer 330 disposed apart from and disposed on and separate from the LED light source 310. According to an embodiment, the LED light source 310 may be disposed on at least one side of light conversion layer 330. The LED light source 310 may be an LED light source emitting blue light or an LED light source emitting ultraviolet (UV) light.

Then, a light passage may be positioned between the LED light source 310 and the light conversion layer 330, for example, a light guide panel 320 may be disposed between the light conversion layer 330 and the LED light source 310. The light guide panel 320 guides light emitted from the LED light source 310 toward the light conversion layer 330. A reflector (not shown) may be further disposed on a lower surface of the light guide panel 320.

Accordingly, the light emitted from the LED light source 310 is guided into the light conversion layer 330 through the light guide panel 320. The incident light is transmitted into the light conversion layer 330 and converted into white light.

The light conversion layer 330 includes a polymer matrix and a semiconductor nanocrystal. The light conversion layer has excellent and improved color reproducibility and color purity, due to the semiconductor nanocrystal. The semiconductor nanocrystal and the polymer matrix are the same as described for the light conversion layer 130 of FIG. 1.

In an embodiment, a polymer layer may be disposed on a surface of the light conversion layer 330, of FIG. 5. In an embodiment, the first polymer layer 133 and the second polymer layer 135 as shown in FIG. 2, may be disposed on at least one surface of the light conversion layer 330.

In another embodiment, the light conversion layer 330 may include a plurality of layers. Accordingly, the plurality of layers may be disposed so that the energy of light emitting wavelength is decreased going toward the LED light source 310. For example, if the LED light source 310 is a blue LED light source, the light conversion layer 330 may include a red light conversion layer and a green light conversion layer sequentially stacked in a direction away from the LED light source 310.

Even though not shown in FIG. 5, at least one selected from a diffusion plate, a prism sheet, a microlens sheet, and a brightness enhancement layer (e.g., a double brightness enhancement film ("DBEF")) may be further disposed between the light conversion layer 330 and liquid crystal panel. The diffusion plate may be disposed on and separate from the light conversion layer or may be disposed on and in contact with a surface of the light conversion layer 330, as described in FIGS. 3 and 4.

In addition, the light conversion layer 330 may be disposed between at least two layers selected from a light guide panel, a diffusion plate, a prism sheet, a microlens sheet, and a brightness enhancement layer (e.g., a double brightness enhancement film ("DBEF")). The light conversion layer 330 may be disposed on and in contact with a surface of the diffusion plate or may be disposed on and separate from the diffusion plate.

As described above, the light conversion layers 130, 131, 230, and 330, of FIGS. 1 and 3, 2, 4, and 5, respectively, improve color reproducibility and color purity by including a semiconductor nanocrystal. Since the light conversion layer 130, 131, 230, and 330 is disposed on and separate from the LED light sources 110, 210, and 310, the light conversion layers 130, 131, 230, and 330 may be not be degraded by the heat generated from LED light sources 110, 210, and 310.

In addition, since the light conversion layers 130, 131, 230, and 330 including a polymer matrix and the semiconductor nanocrystal may be fabricated as a separate layer, the backlight unit may be manufactured in a simpler process.

Hereinafter, the embodiments are illustrated in more detail with reference to examples. However, the following are exemplary embodiments and are not limiting of the claims.

Preparation Example 1

Synthesis of Green Semiconductor Nanocrystal Coated with the First Polymer

About 18.4 grams (g) of polyethylene-polyacrylic acid copolymer (including 15 wt % of polyacrylic acid, $T_m$ 87° C.) is put in a flask, and 98 milliliters (ml) of toluene is added thereto under a nitrogen atmosphere, providing a polymer solution. The polymer solution is heated up to 100° C. to dissolve the polymer therein.

Green light emitting semiconductor nanocrystal with a light emitting wavelength of 531 nanometers (nm) is dispersed into 40 ml of toluene to have 0.069 of optical density ("OD") (absorbance of the first absorption maximum wavelength in UV-Vis absorption spectrum of a 100 times-diluted solution), providing a semiconductor nanocrystal dispersion solution The semiconductor nanocrystal dispersion solution is added into the polymer solution. The mixed solution is stirred at 100° C. for 1 hour. Then, 100 ml of a solution prepared by dissolving zinc acetate $(Zn(Et)_2)$ in a concentration of 0.2 Molar (M) in toluene is added to the mixed solution in a dropwise fashion and reacted for 30 minutes. After the reaction, the reactant is cooled down to 50° C., filtered, washed with hexane, and vacuum-dried, providing a green light emitting semiconductor nanocrystal coated with a polyethylene-polyacrylic acid copolymer having a coordinate covalent bond with zinc cations as a first polymer. Herein, about 320 parts by weight of the first polymer is coated based on 100 parts by weight of the green light emitting semiconductor nanocrystal.

Preparation Example 2

Synthesis of Red Semiconductor Nanocrystal Coated with the First Polymer

About 1.87 g of polyethylene-polyacrylic acid copolymer (including 15 wt % of polyacrylic acid, $T_m$ 87° C.) is put in a flask, and 8 ml of toluene is added thereto under a nitrogen atmosphere, providing a polymer solution. The polymer solution is heated up to 100° C. to dissolve the polymer therein. Separately, red semiconductor nanocrystal having 619 nm of a light emitting wavelength is dispersed into 40 ml of toluene to have 0.028 of optical density ("OD") (absorbance of the first absorption maximum wavelength in UV-Vis absorption spectrum of a 100 times-diluted solution), providing a semiconductor nanocrystal dispersion solution. The semiconductor nanocrystal dispersion solution is mixed with the polymer solution. The mixed solution is stirred at 100° C. for 1 hour. Then, 10 ml of a solution prepared by dissolving zinc acetic acetate $((Zn)Et)_2)$ in a concentration of 0.2 M is added to the mixed solution in a dropwise fashion and reacted for 30 minutes. After the reaction, the reactant is cooled down to 50° C., filtered, and washed with hexane, and vacuum dried, providing a red semiconductor nanocrystal coated with a polyethylene-polyacrylic acid copolymer having coordinate covalent bond with zinc cations as a first polymer. The first polymer is coated in an amount of about 595 parts by weight based on 100 parts by weight of the red semiconductor nanocrystal.

Example 1

Fabrication of Light Conversion Layer 0.441 g of the green semiconductor nanocrystal coated with a first polymer prepared according to Preparation Example 1, 0.101 g of the red semiconductor nanocrystal coated with a first polymer prepared according to Preparation Example 2, and 15 g of a polyethylene-polymethacrylic acid copolymer (including 15 wt % of polymethacrylic acid) having a coordinate covalent bond with zinc cations (a second polymer) are subject to cryogenic milling at an extremely low temperature of −70° C. and mixed with a roll mixer. The second polymer has a melting index of 14.0 g/10 minutes. Then, the mixture is uniformly mixed by a twin screw mixer at 150° C. and hot-pressed into a light conversion layer at 150° C.

Example 2

Fabrication of Light Conversion Layer 0.441 g of the green semiconductor nanocrystal coated with a first polymer prepared according to Preparation Example 1, 0.101 g of the red semiconductor nanocrystal coated with a first polymer prepared according to Preparation Example 2, and 15 g of a polyethylene-polymethacrylic acid copolymer having a coordinate covalent bond with zinc cations (including 15 wt % of polymethacrylic acid) (a second polymer) are mixed with a roll mixer after cryogenic milling at −70° C. The second polymer has a melting index of 14.0 g/10 min. Then, the mixture is uniformly mixed by a twin screw mixer at 150° C. and hot-pressed at 150° C. into a layer. The layer is laminated with polyethyleneterephthalate on both sides by using an optically clear adhesive ("OCA"), fabricating a light conversion layer.

Example 3

Fabrication of Light Conversion Layer 0.441 g of the green light emitting semiconductor nanocrystal coated with a first polymer prepared according to Preparation Example 1, 0.101 g of the red semiconductor nanocrystal coated with a first polymer prepared according to Preparation Example 2, and 15 g of a polyethylene-polymethacrylic acid copolymer (including 15 wt % of polymethacrylic acid) having a coordinate covalent bond with zinc cations (a second polymer) is mixed with a roll mixer after cryogenic milling at −70° C. The second polymer has a melting index of 14.0 g/10 min. Next, the mixture is uniformly mixed at 150° C. by a twin screw mixer and hot-pressed into a layer at 150° C. First and second polymer layers are fabricated by depositing $SiO_2$ to be 10 nm thick on a 50 μm-thick polyethyleneterephthalate. These first and the second polymer layers are laminated on both side of the aforementioned layer with OCA, fabricating a light conversion layer. Herein, the first and second polymer layers are laminated so that the $SiO_2$ deposited therein does not contact with the layer.

Example 4

Fabrication of Light Conversion Layer 0.588 g of the green semiconductor nanocrystal coated with a first polymer prepared according to Preparation Example 1, 0.134 g of the red semiconductor nanocrystal coated with a first polymer prepared according to Preparation Example 2, and 20 g of polyethylene (a second polymer) are mixed with a roll mixer after cryogenic milling at −70° C. Then, the mixture is uniformly mixed at 180° C. by a twin screw mixer and hot-pressed into a light conversion layer at 170° C.

Example 5

Fabrication of Light Conversion Layer 0.588 g of the green semiconductor nanocrystal coated with a first polymer prepared according to Preparation Example 1, 0.134 g of the red semiconductor nanocrystal coated with a first polymer prepared according to Preparation Example 2, and 20 g of polyethylene (a second polymer) are mixed with a roll mixer after cryogenic milling at −70° C. Next, the mixture is uniformly mixed at 180° C. by a twin screw mixer and hot-pressed into a light conversion layer at 170° C. Then, polyethyleneterephthalate is laminated on both sides of the light conversion layer with OCA.

Example 6

Fabrication of Light Conversion Layer 0.588 g of the green semiconductor nanocrystal coated with a first polymer prepared according to Preparation Example 1, 0.134 g of the red semiconductor nanocrystal coated with a first polymer prepared according to Preparation Example 2, and 20 g of polyethylene (a second polymer) are mixed with a roll mixer after cryogenic milling at −70° C. Next, the mixture is uniformly mixed at 180° C. by a twin screw mixer and hot-pressed into a light conversion layer at 170° C. Separately, first and second polymer layers are fabricated by depositing $SiO_2$ to be 10 nm thick on a 50 μm-thick polyethyleneterephthalate. The first and second polymer layers are laminated on both sides of the light conversion layer having semiconductor nanocrystal and polymer matrix, with OCA, fabricating a light conversion layer.

According to an embodiment, the first and second polymer layers are laminated on the light conversion layer, so that the deposited $SiO_2$ of the first and second polymer layers may not contact with the light conversion layer.

Figure 6:
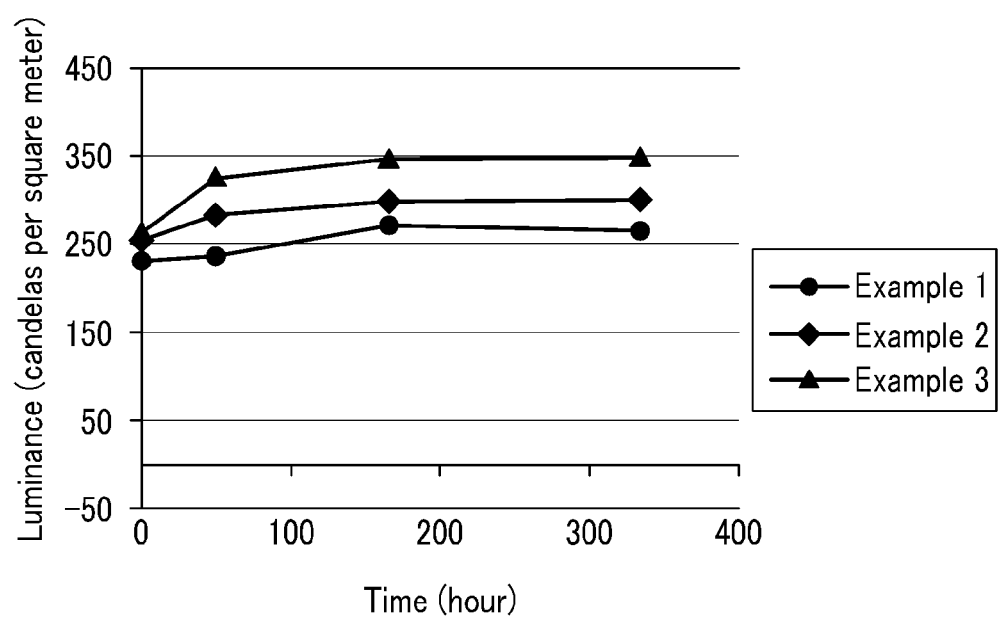
FIG. 6 is a graph of time (hours) versus luminance (candelas per square meter, cd/m$^2$) which shows measurement results of the backlight units ("BLU") fabricated by inserting each light conversion layer according to Examples 1 to 3 between a light guide and a prism sheet.
Figure 7:
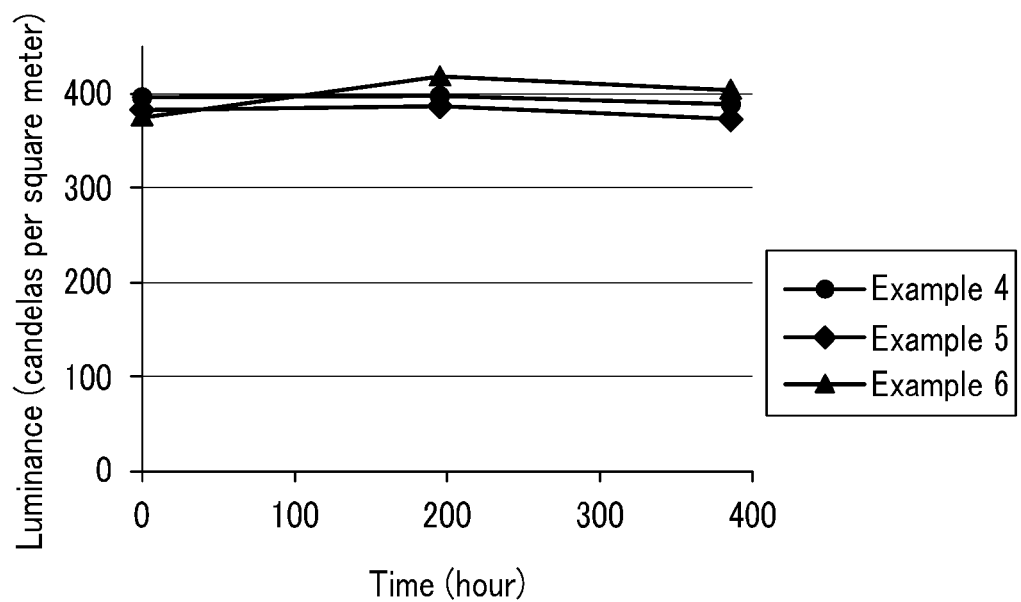
FIG. 7 is a graph of showing time (hours) versus luminance (candelas per square meter cd/m$^2$) of the backlight units ("BLU") fabricated by inserting each light conversion layer according to Examples 4 to 6, between a light guide and a prism sheet.

FIG. 6 shows time (hours) versus luminance in candela per square meter ($cd/m^2$) of a backlight unit ("BLU") fabricated by inserting each light conversion layer according to Examples 1 to 3 between a light guide panel and a prism sheet. FIG. 7 shows time (hours) versus luminance ($cd/m^2$) of a backlight unit ("BLU") fabricated by inserting each light conversion layer according to Examples 4 to 6 between a light guide panel and a prism sheet.

As shown in FIGS. 6 and 7, the backlight units maintain luminance well after operating for about 300 to 400 hours.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present disclosure in any way.

What is claimed is:

1. A backlight unit for a liquid crystal display device, comprising
    a light emitting diode light source;
    a light conversion layer disposed apart from the light emitting diode light source, wherein the light conversion layer is configured to convert light emitted from the light emitting diode light source to white light and provide the white light to a liquid crystal panel; and
    a light guide panel disposed between the light emitting diode light source and the light conversion layer,
    wherein the light conversion layer comprises a semiconductor nanocrystal and a polymer matrix,
    wherein the semiconductor nanocrystal is coated with a first polymer selected from a polymer comprising a carboxylic acid group (—C(=O)OH), a monovalent salt thereof (—C(=O)O$^-$M$^+$, wherein M is a monovalent cation), a multivalent salt thereof (—C(=O)O$^-$(M$^{x+}$)$_{(1/x)}$, wherein M is a cation having a valence of x wherein x is two or more), and a combination thereof, and
    wherein the polymer matrix comprises a thermoplastic second polymer selected from a polyolefin; a cyclic olefin polymer; a polymer comprising a carboxylic acid group (—C(=O)OH), a monovalent salt thereof (—C(=O)O$^-$M$^+$, wherein M is a monovalent cation), or a multivalent salt thereof (—C(=O)O$^-$(M$^{x+}$)$_{(1/x)}$, wherein M is a cation having a valence of x wherein x is two or more), and a combination thereof; a polyamide; a polyimide; a polyamideimide; a polyetherimide; a polyacrylonitrile; a polyarylene ether; a polyarylene sulfide; a polyarylene sulfone; a polybenzoxazole; polybenzothiazole; a polybutadiene; a polycarbonate; a polycarbonate ester; a polyether ketone; a polyether ether ketone; a polyether ketone ketone; a polyethersulfone; a polyisoprene; a polyphosphazene; a polystyrene; a rubber-modified polystyrene; a polyoxadiazole; a polysilazane; a polysulfone; a polysulfonamide; a polyvinyl acetate; a polyvinyl chloride; a polyvinyl ester; a polyvinyl ether; a polyvinyl halide; a polyvinyl nitrile; a polyvinyl thioether; a polyurea; a polyurethane; an epoxy; an ethylene propylene diene rubber; an ethylene propylene diene monomer rubber; a silicone; and a combination thereof.

2. The backlight unit for a liquid crystal display device of claim 1, wherein the backlight unit further comprises at least one selected from a diffusion plate, a prism sheet, a microlens sheet, and a brightness enhancement layer disposed on the light guide panel, and
the light conversion layer is disposed between at least two selected from the light guide panel, the diffusion plate, the prism sheet, the microlens sheet, and the brightness enhancement layer.

3. The backlight unit for a liquid crystal display device of claim 1, wherein the light emitting diode light source is disposed at a side of the light conversion layer.

4. The backlight unit for a liquid crystal display device of claim 1, wherein the semiconductor nanocrystal is selected from a Group II-VI compound, a Group III-V compound, a Group IV-VI compound, a Group IV element, a Group IV compound, and a combination thereof.

5. The backlight unit for a liquid crystal display device of claim 1, wherein the semiconductor nanocrystal has a full width at half maximum ("FWHM") of less than or equal to about 45 nanometers in a light emitting wavelength spectrum.

6. The backlight unit for a liquid crystal display device of claim 1, wherein at least one of the first polymer and the second polymer comprising the carboxylic acid group or the salt thereof is selected from a polyacrylic acid, a polymethacrylic acid, a poly(alkylene-co-acrylic acid), a poly(alkylene-co-methacrylic acid), a salt thereof, and a combination thereof.

7. The backlight unit for a liquid crystal display device of claim 1, wherein at least one of the first polymer and the second polymer comprising the monovalent salt or the multivalent salt comprises an alkylene structural unit and an anionic structural unit represented by the following Chemical Formula 1:

Chemical Formula 1

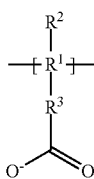

wherein, in Chemical Formula 1, $R^1$ is a substituted or unsubstituted C2 to C20 alkylene group,
$R^2$ is selected from hydrogen and a substituted or unsubstituted C1 to C10 alkyl group, and
$R^3$ is selected from a substituted or unsubstituted C1 to C50 alkylene group; a substituted or unsubstituted C2 to C50 alkenylene group; a C1 to C50 alkylene group wherein at least one methylene group ($-CH_2-$) is replaced by a group selected from a sulfonyl group ($-S(=O)_2-$), a carbonyl group ($-C(=O)-$), an ether group ($-O-$), a sulfide group ($-S-$), a sulfoxide group ($-S(=O)-$), an ester group ($-C(=O)O-$), an amide group ($-C(=O)NR-$) (wherein R is hydrogen or a C1 to C10 alkyl group), an $-NR-$ group (wherein R is hydrogen or a C1 to C10 alkyl group), and a combination thereof; or a C2 to C50 alkenylene group wherein at least one methylene group ($-CH_2-$) is substituted with a sulfonyl group ($-S=O_2-$), a carbonyl group ($-C(=O)-$), an ether group ($-O-$), a sulfide group ($-S-$), a sulfoxide group ($-S=O-$), an ester group ($-C(=O)O-$), an amide group ($-C(=O)NR-$) (wherein R is hydrogen or a C1 to C10 alkyl group), an $-NR-$ group (wherein R is hydrogen or a C1 to C10 alkyl group), and a combination thereof.

8. The backlight unit for a liquid crystal display device of claim 1, wherein the monovalent cation of the monovalent salt of the carboxylic acid group of the first polymer or the second polymer is a cation of an alkali metal.

9. The backlight unit for a liquid crystal display device of claim 1, wherein the cation having a valence x wherein x is two or more of the multivalent salt of the carboxylic acid group of the first polymer or the second polymer, is a cation of a metal selected from an alkaline-earth metal, a rare earth element, a transition element, a Group 12 element, a Group 13 element, and a combination thereof.

10. The backlight unit for a liquid crystal display device of claim 1, wherein the light conversion layer further comprises an inorganic oxide.

11. The backlight unit for a liquid crystal display device of claim 1, wherein the converted white light emitted from the light conversion layer has a Cx color coordinate of about 0.20 to about 0.50, and a Cy color coordinate of about 0.18 to about 0.42 in a CIE 1931 chromaticity diagram.

12. The backlight unit for a liquid crystal display device of claim 1, wherein the light emitting diode light source is a blue light emitting diode light source, and the light conversion layer comprises a green light emitting semiconductor nanocrystal and a red light emitting semiconductor nanocrystal in a weight ratio of about 6:1 to about 11:1, based on the total weight of the semiconductor nanocrystals.

13. The backlight unit for a liquid crystal display device of claim 1, wherein the light conversion layer comprises the semiconductor nanocrystal coated with the first polymer, and the polymer matrix comprising the thermoplastic second polymer; and
further comprises at least one of a first polymer layer and a second polymer layer disposed on at least one surface of the light conversion layer,
wherein the first polymer layer and the second polymer layer each independently comprises a polymer selected from a polyester, a cyclic olefin polymer, a polymerized product of a first monomer comprising at least two thiol ($-SH$) groups at a terminal end and a second monomer comprising at least two carbon-carbon unsaturated bond-containing groups at a terminal end, and a combination thereof.

14. The backlight unit for a liquid crystal display device of claim 13, wherein at least one of the first polymer layer and the second polymer layer further comprises an inorganic oxide.

15. The backlight unit for a liquid crystal display device of claim 13, wherein at least one of the first polymer layer and the second polymer layer has a concavo-convex pattern on a surface opposite the light conversion layer.

16. A liquid crystal display device, comprising
a light emitting diode light source;
a light conversion layer disposed apart from the light emitting diode light source, wherein the light conversion layer is configured to convert light emitted from the light emitting diode light source to white light and provide the white light to a liquid crystal panel;
a light guide panel disposed between the light emitting diode light source and the light conversion layer; and
a liquid crystal panel, which is configured to provide an image using a light provided from the light conversion layer,
wherein
the light conversion layer comprises a semiconductor nanocrystal and a polymer matrix,
wherein the semiconductor nanocrystal is coated with a first polymer selected from a polymer comprising a carboxylic acid group (—C(═O)OH), a monovalent salt thereof (—C(═O)O⁻M⁺, wherein M is a monovalent cation), a multivalent salt thereof (—C(═O)O⁻(M^{x+})_{(1/x)}, wherein M is a cation having a valence of x wherein x is two or more), and a combination thereof, and
wherein the polymer matrix comprises a thermoplastic second polymer selected from a polyolefin; a cyclic olefin polymer; a polymer comprising a carboxylic acid group (—C(═O)OH), a monovalent salt thereof (—C(═O)O⁻M⁺, wherein M is a monovalent cation), a multivalent salt thereof (—C(═O)O⁻(M^{x+})_{(1/x)}, wherein M is a cation having a valence of x wherein x is two or more), and a combination thereof; a polyamide; a polyimide; a polyamideimide; a polyetherimide; a polyacrylonitrile; a polyarylene ether; a polyarylene sulfide; a polyarylene sulfone; a polybenzoxazole; polybenzothiazole; a polybutadiene; a polycarbonate; a polycarbonate ester; a polyether ketone; a polyether ether ketone; a polyether ketone ketone; a polyethersulfone; a polyisoprene; a polyphosphazene; a polystyrene; a rubber-modified polystyrene; a polyoxadiazole; a polysilazane; a polysulfone; a polysulfonamide; a polyvinyl acetate; a polyvinyl chloride; a polyvinyl ester; a polyvinyl ether; a polyvinyl halide; a polyvinyl nitrile; a polyvinyl thioether; a polyurea; a polyurethane; an epoxy; an ethylene propylene diene rubber; an ethylene propylene diene monomer rubber; a silicone; and a combination thereof.

17. The liquid crystal display device of claim 16, further comprising at least one selected from a diffusion plate, a prism sheet, a microlens sheet, and a brightness enhancement layer, disposed on the light guide panel,
wherein the light conversion layer is disposed between at least two selected from the light guide panel, the diffusion plate, the prism sheet, the microlens sheet, and the brightness enhancement layer.

18. The liquid crystal display device of claim 16, wherein the light emitting diode light source is disposed at a side of the light conversion layer.

19. The liquid crystal display device of claim 16, wherein at least one of the first polymer and the second polymer comprising the carboxylic acid group or the salt thereof is selected from a polyacrylic acid, a polymethacrylic acid, a poly(alkylene-co-acrylic acid), a poly(alkylene-co-methacrylic acid), a salt thereof, and a combination thereof.

20. The liquid crystal display device of claim 16, wherein at least one of the first polymer and the second polymer comprising the monovalent salt or the multivalent salt comprises an alkylene structural unit and a structural unit represented by the following Chemical Formula 1:

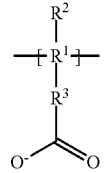

Chemical Formula 1 wherein, in Chemical Formula 1, R¹ is a substituted or unsubstituted C2 to C20 alkylene group,
R² is selected from hydrogen; or a substituted or unsubstituted C1 to C10 alkyl group,
R³ is selected from a single bond; a substituted or unsubstituted C1 to C50 alkylene group; a substituted or unsubstituted C2 to C50 alkenylene group; a C1 to C50 alkylene group wherein at least one methylene group (—CH₂—) is replaced by a group selected from a sulfonyl group (—S(═O)₂—), a carbonyl group (—C(═O)—), an ether group (—O—), a sulfide group (—S—), a sulfoxide group (—S(═O)—), an ester group (—C(═O)O—), an amide group (—C(═O)NR—) (wherein R is hydrogen or a C1 to C10 alkyl group), an —NR— group (wherein R is hydrogen or a C1 to C10 alkyl group), and a combination thereof; and a C2 to C50 alkenylene group wherein at least one methylene group (—CH₂—) is substituted with a sulfonyl group (—S═O₂—), a carbonyl group (—C(═O)—), an ether group (—O—), a sulfide group (—S—), a sulfoxide group (—S═O—), an ester group (—C(═O)O—), an amide group (—C(═O)NR—) (wherein R is hydrogen or a C1 to C10 alkyl group), an —NR— group (wherein R is hydrogen or a C1 to C10 alkyl group), and a combination thereof.

21. The liquid crystal display device of claim 16, wherein the monovalent cation of the monovalent salt of the carboxylic acid group of the first polymer or the second polymer is a cation of an alkali metal.

22. The liquid crystal display device of claim 16, wherein the cation having a valence of x wherein x is two or more of the multivalent salt of the carboxylic acid group of the first polymer or the second polymer is a cation of a metal selected from an alkaline-earth metal, a rare earth element, a transition element, a Group 12 element, a Group 13 element, and a combination thereof.

23. The liquid crystal display device of claim 16, wherein the light conversion layer comprises an inorganic oxide.

24. The liquid crystal display device of claim 16, wherein the light conversion layer comprises a semiconductor nanocrystal coated with the first polymer, and the polymer matrix comprising the thermoplastic second polymer; and
further comprises at least one of a first polymer layer and a second polymer layer disposed on at least one surface of the light conversion layer,
wherein the first polymer layer and the second polymer layer each independently comprise a polymer selected from a polyester, a cyclic olefin polymer, a polymerized product of a first monomer comprising at least two thiol (—SH) groups at a terminal end and a second monomer comprising at least two carbon-carbon unsaturated bond-containing groups at a terminal end, and a combination thereof.

25. The liquid crystal display device of claim 24, wherein at least one of the first polymer layer and the second polymer layer further comprises an inorganic oxide.

26. The liquid crystal display device of claim 24, wherein at least one of the first polymer layer and the second polymer layer has a concavo-convex pattern on a side opposite the light conversion layer.

* * * * *